United States Patent
Shinagawa

(10) Patent No.: US 8,237,945 B2
(45) Date of Patent: Aug. 7, 2012

(54) IMAGE PROCESSING APPARATUS, METHOD OF CONTROLLING THE SAME AND STORAGE MEDIUM

(75) Inventor: Kazutaka Shinagawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 531 days.

(21) Appl. No.: 12/553,575

(22) Filed: Sep. 3, 2009

(65) Prior Publication Data

US 2010/0053688 A1 Mar. 4, 2010

(30) Foreign Application Priority Data

Sep. 4, 2008 (JP) ................................ 2008-227161

(51) Int. Cl.
*G06K 15/02* (2006.01)
*G06F 3/12* (2006.01)

(52) U.S. Cl. ...................................... 358/1.13; 358/1.15

(58) Field of Classification Search .................... 358/1.2, 358/1.9, 2.1, 1.13, 1.15, 1.16, 1.18, 501, 358/518, 524, 527, 530, 401, 444, 448, 451, 358/462, 296; 348/207.2, 231.3, 231.6
See application file for complete search history.

(56) References Cited

U.S. PATENT DOCUMENTS

| | | | |
|---|---|---|---|
| 6,597,468 B1 * | 7/2003 | Inuiya | 358/1.15 |
| 7,907,291 B2 * | 3/2011 | Ishii et al. | 358/1.13 |
| 2003/0231320 A1 | 12/2003 | Tsunekawa | |
| 2007/0229857 A1 * | 10/2007 | Aiso | 358/1.1 |
| 2008/0037060 A1 * | 2/2008 | Ono et al. | 358/1.15 |
| 2008/0084585 A1 * | 4/2008 | Shibata et al. | 358/401 |
| 2010/0060928 A1 * | 3/2010 | Lee et al. | 358/1.15 |

FOREIGN PATENT DOCUMENTS

JP 2003-312068 A 11/2003

* cited by examiner

*Primary Examiner* — Scott A Rogers
(74) *Attorney, Agent, or Firm* — Rossi, Kimms & McDowell LLP

(57) ABSTRACT

An image processing apparatus which makes it possible not only to improve reusability of data in another apparatus, but also to increase the speed of data output. If a process is requested to be executed on the image data and the file data contains data usable by the image processing apparatus in addition to the image data, the apparatus executes the requested process using the usable data, whereas if the file data does not contain data usable by the image processing apparatus in addition to the image data, the apparatus executes the requested process using the image data. Further, the apparatus adds data generated during execution of the requested process using the image data to the file data, as data usable by the apparatus.

11 Claims, 12 Drawing Sheets

IMAGE PROCESSING APPARATUS, METHOD OF CONTROLLING THE SAME AND STORAGE MEDIUM

BACKGROUND OF THE INVENTION

1. Field of the Invention

The present invention relates to an image processing apparatus for processing file data including image data, a method of controlling the image processing apparatus, and a storage medium storing a program for causing a computer to execute the method.

2. Description of the Related Art

In recent years, an image processing apparatus that is configured to analyze image data received from an external apparatus or device, and generate a print job based on the analyzed image data, to thereby output the print job has been demanded to increase the speed of the function of a so-called reprint (multi-copy print) in which a print job generated and output is stored and is then output again.

As a conventional technique for carrying out multi-copy print or reprint processing at high speed, there has been proposed a technique in which a generated image (bitmap image) is spooled in an external storage device together with an ID, and the spooled image is reused for second-time and following outputs. This technique makes it possible to save time and labor required for analysis of print data to thereby speed up reprint processing.

It is not printing alone which is in a situation demanding a higher operation speed, but concerning processing for displaying image data on a display section of an image processing apparatus as well, when re-displaying image data having once displayed, a higher speed display is demanded.

In an image processing apparatus disclosed in Japanese Patent Laid-Open publication No. 2003-312068, in the case of generating a page image associated with print data received from an external apparatus or device, the print data is analyzed, and then the page image is generated and stored in a hard disk connected to the image processing apparatus. Thereafter, when instructed to reprint the page image, the image processing apparatus reads out the page image from the hard disk and reprints the same.

However, the above-mentioned image processing apparatus suffers from a problem that a generated page image is specific to the image processing apparatus which generated the same, and hence it is difficult for another apparatus to reuse the page image. Further, the page image is stored in the hard disk, which makes reuse of the page image by another apparatus more difficult.

SUMMARY OF THE INVENTION

The present invention provides an image processing apparatus which makes it possible not only to improve reusability of data in another apparatus, but also to increase the speed of data output, a method of controlling the image processing apparatus, and a storage medium storing a program for causing a computer to execute the method.

In a first aspect of the present invention, there is provided an image processing apparatus for processing file data containing image data, comprising a process execution unit configured to execute a process requested for the image data, using data usable by the image processing apparatus, when the file data contains the data usable by the image processing apparatus in addition to the image data, and execute the requested process using the image data, when the file data does not contain data usable by the image processing apparatus in addition to the image data, and an adding unit configured to add data generated during execution of the requested process by the process execution unit using the image data, to the file data, as data usable by the image processing apparatus.

In a second aspect of the present invention, there is provided a method of controlling an image processing apparatus for processing file data containing image data, comprising executing a process requested for the image data, using data usable by the image processing apparatus, when the file data contains the data usable by the image processing apparatus in addition to the image data, and executing the requested process using the image data, when the file data does not contain data usable by the image processing apparatus in addition to the image data, and adding data generated during execution of the requested process using the image data, to the file data, as data usable by the image processing apparatus.

In a third aspect of the present invention, there is provided a storage medium storing a program for causing a computer to execute a method of controlling an image processing apparatus for processing file data containing image data, wherein the method comprises executing a process requested for the image data, using data usable by the image processing apparatus, when the file data contains the data usable by the image processing apparatus in addition to the image data, and executing the requested process using the image data, when the file data does not contain data usable by the image processing apparatus in addition to the image data, and adding data generated during execution of the requested process using the image data, to the file data, as data usable by the image processing apparatus.

According to the present invention, it is possible to speed up second-time and following processing operations to thereby improve reusability of file data in the image processing apparatus itself or an external apparatus and increase the speed of data output at the same time.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof. An image processing apparatus according to each of the embodiments of the present invention is applied to an image output system.

Figure 1:
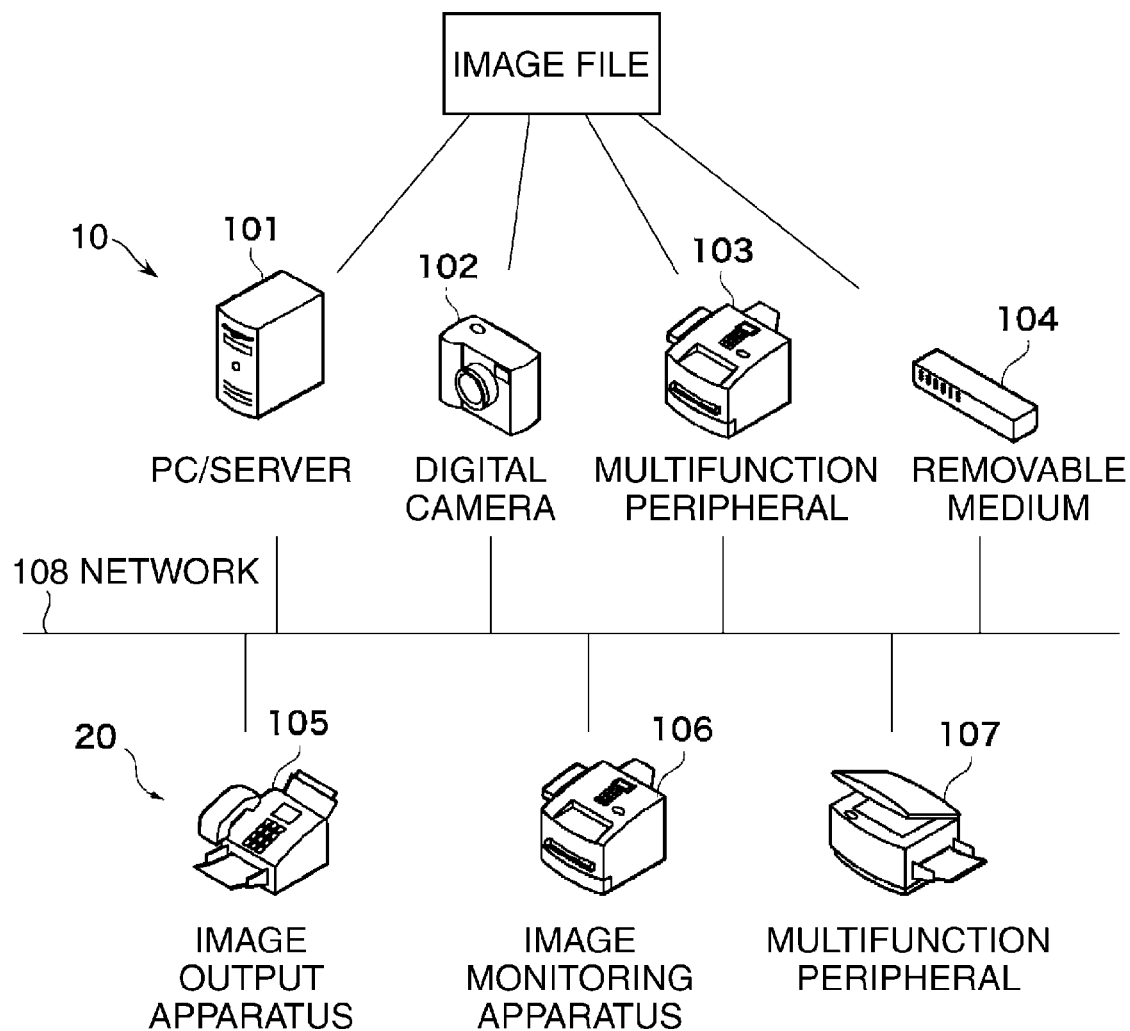
FIG. 1 is a diagram of the whole arrangement of an image output system including an image processing apparatus according to a first embodiment of the present invention.

FIG. 1 is a diagram of the image output system including the image processing apparatus according to the first embodiment of the present invention. The image output system is comprised of image file storage apparatuses and devices 10 for storing image file data (hereinafter simply referred to as "image files") and image processing apparatuses 20 for processing the image files.

Specifically, the image file storage apparatuses and devices 10 include a PC/server 101, a digital camera 102, a multifunction peripheral 103, and a removable medium 104. It should be noted that any other apparatuses or device than the above-mentioned ones can be employed insofar as it is capable of storing image files.

The image processing apparatuses 20 for processing image files stored in the image file storage apparatuses and devices 10 include an image output apparatus 105, an image monitoring apparatus 106, and a multifunction peripheral 107. It should be noted that any other apparatuses than the above-mentioned ones can be employed insofar as it is capable of processing images.

Further, in the example shown in FIG. 1, the image output system is formed by interconnecting the image file storage apparatuses and devices 10 and the image processing apparatuses 20 by a network 108, and the network 108 is used for image file transfer. However, this is not limitative, but the image output system may be configured such that image files are transferred through a local connection represented by a USB or a serial interface.

Figure 2:
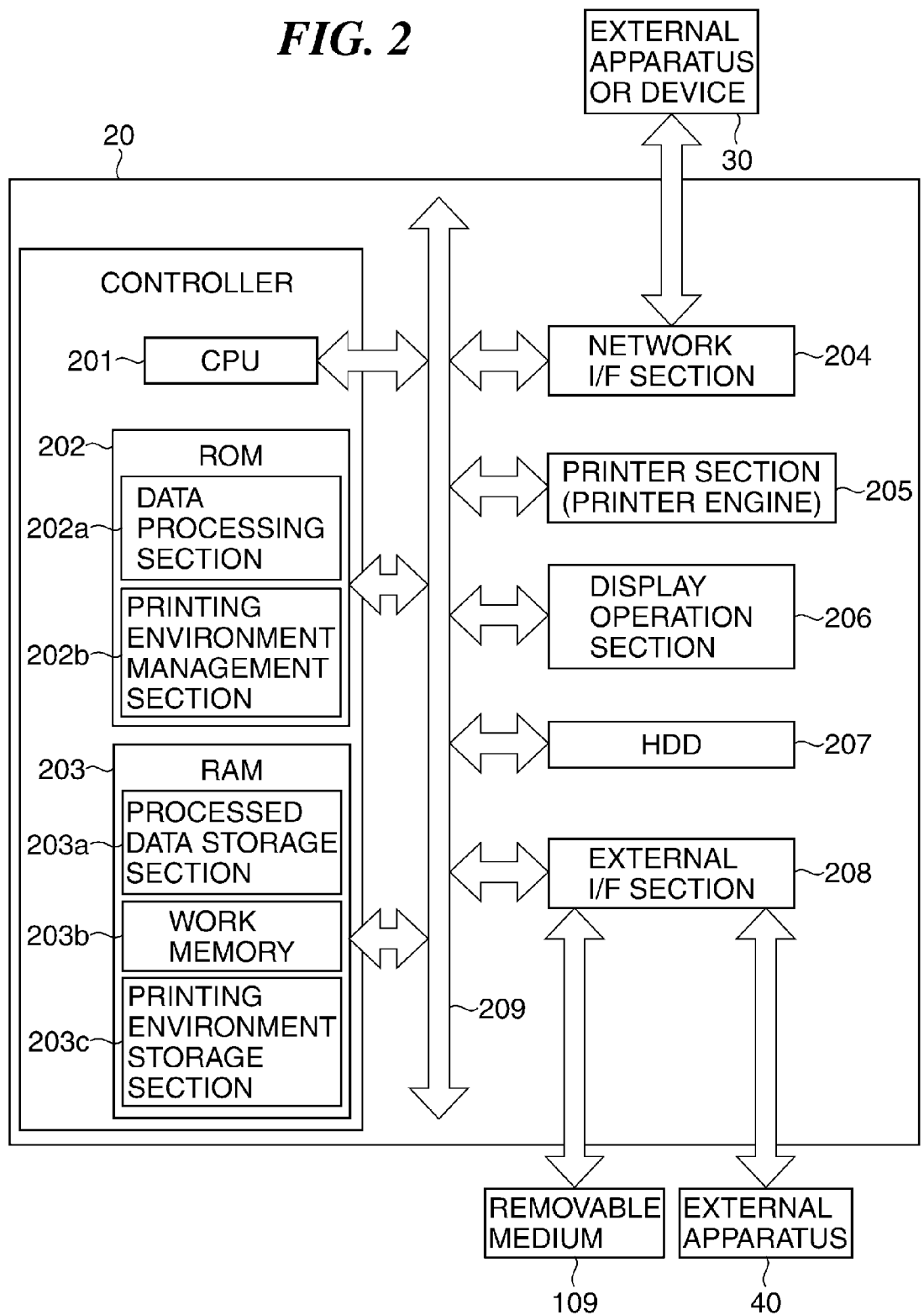
FIG. 2 is a block diagram of the image processing apparatus appearing in FIG. 1.

FIG. 2 is a block diagram of the image processing apparatus 20. An external apparatus or device 30 in FIG. 2 is an example of an external image file storage apparatus or device 10 connected to the image processing apparatus 20 via the network 108. As mentioned hereinbefore, the external apparatus or device 30 is one of the PC/server 101, the digital camera 102, the multifunction peripheral 103, and the removable medium 104, for example. A removable medium 109 is an example of an external image file storage device directly connected to the image processing apparatus 20. Further, an external apparatus 40 is an example of an external image file storage apparatus directly connected to the image processing apparatus 20. Specifically, as the external apparatus 40, there may be mentioned a PC/server, a digital camera, and a multifunction peripheral.

In the image processing apparatus 20, a CPU 201 performs centralized control of access to devices connected to a system bus 209, according to control programs stored in a ROM (Read Only Memory) 202. The ROM 202 has a data processing section 202a as a control program, for performing various kinds of processing on received image data. Further, the ROM 202 has a printing environment management section 202b as a control program, for managing the state of a printer section 205.

A RAM 203 has a processed data storage section 203a, a work memory 203b, and a printing environment storage section 203c. The processed data storage section 203a functions as an area for storing data processed by the data processing section 202a. The work memory 203b functions as a memory area for temporary use by the data processing section 202a. The printing environment storage section 203c functions as an area for storing the state of the printer section 205 managed by the printing environment management section 202b.

A network interface (I/F) section 204 provides interface for network connection of the image processing apparatus 20 to the external apparatus or device 30. The printer section 205 is a printer engine for actually outputting image print data processed by the data processing section 202a. A display operation section 206 displays the state of the image processing apparatus 20 and that of the printer section 205 for a user. Further, the display operation section 206 displays the state of connection with the external apparatus or device 30, the external apparatus 40, or the removable medium 109, and data stored in the connected apparatus or device, and accepts user selection of data or execution of a user operation. A hard disk 207 is used to store various data not temporarily, but for a long term. An external interface (I/F) section 208 provides interface with the removable medium 109 or the external apparatus 40.

It should be noted that the configuration of the image processing apparatus 20 shown in FIG. 2 is only an example. For example, in a case where data exchange is performed not using a network connection, but using a local connection alone, the network interface section 204 can be dispensed with. Similarly, in some cases, a section appearing in FIG. 2 may not exist, or conversely a section which is not shown in FIG. 2 may exist.

Figure 3:
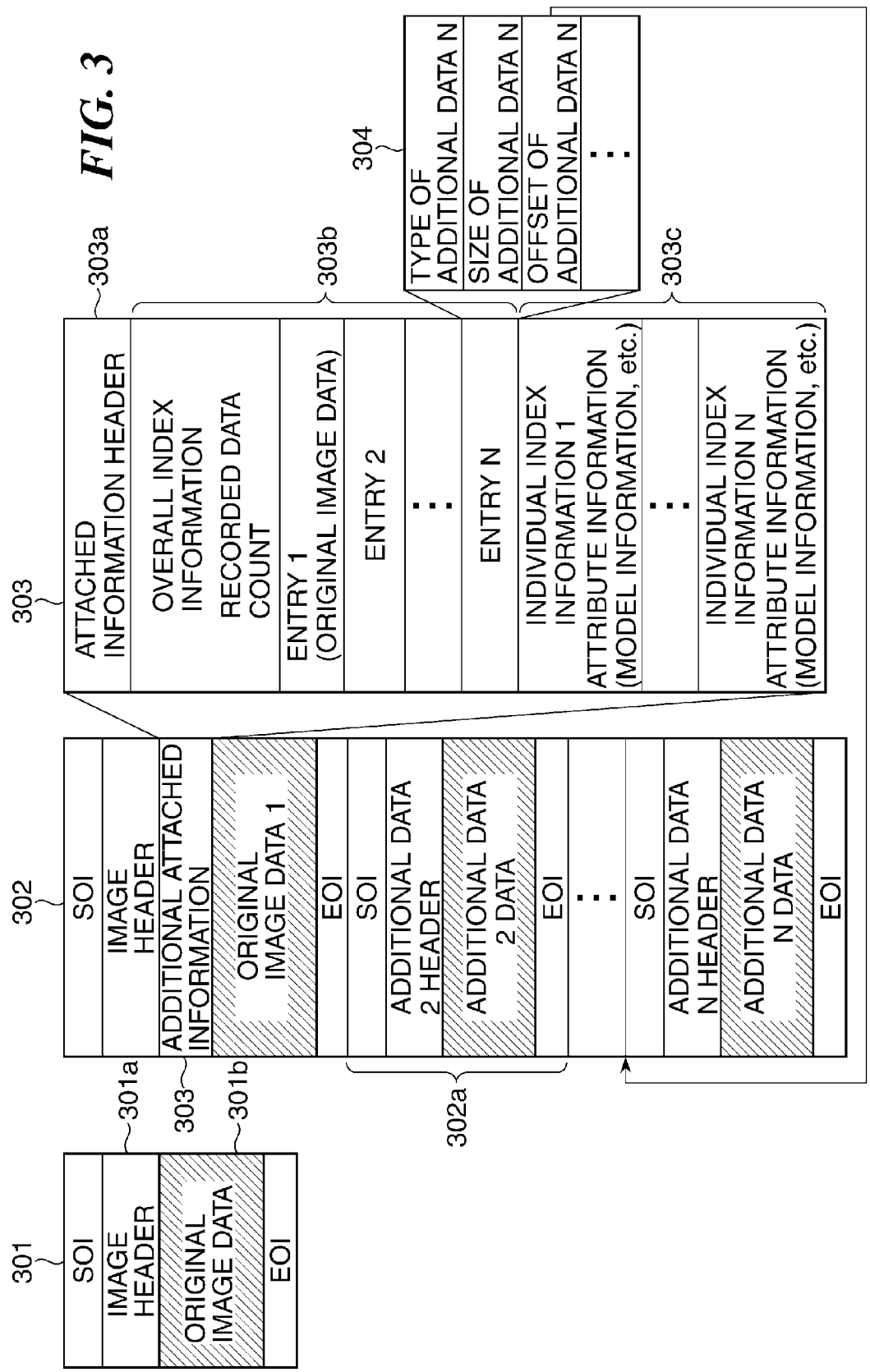
FIG. 3 is a diagram useful in explaining an example of an image file data format.

FIG. 3 is a diagram useful in explaining an example of an image file data format. An image file 301 stores general (e.g. JPEG) image data. The image file 301 has an area sandwiched between an SOI marker and an EOI marker, and an image header 301a and image data 301b are stored in the area.

An image file 302 is formed by adding a plurality of data items to the image file 301. Data to be added may be image data. When an image file contains not only a single image data item but also a plurality of data items, additional attached information 303 is added in an area between the image header and the image data. Similarly to the original image file 301, the data 302a added in the image file 302 has an area sandwiched between an SOI marker and an EOI marker, and an additional data 2 header and additional data 2 data are stored in the area.

The additional attached information 303 is comprised of an attached information header 303a, overall index information 303b, and individual index information (1 to N) 303c. The overall index information 303b is comprised of a recorded data count indicative of how many data items including original image data are stored in the image file 302, and entry information items associated with the respective stored data items. The individual index information 303c includes attribute information such as model information.

Each item of the entry information 304 contained in the overall index information 303b includes data type information indicative of whether the associated data item is the original image data, intermediate data of image data, or data different in resolution. Further, each entry information item 304 includes information on data size and an offset value. It should be noted that the internal data and format of the image file shown in FIG. 3 are only examples, and they are not limitative.

In the following, a description will be given of the operation of the image output system configured as above. Here, a case where the image processing apparatus 20 outputs image data in an image file stored in a USB memory as the removable medium 109 will be described by way of example. Further, a case will be shown where when intermediate data usable by the image processing apparatus 20 exists in the image file, the image data is output using the intermediate data, whereas when usable intermediate data does not exist, intermediate data is added to the image file after execution of a normal output process.

Figure 4:
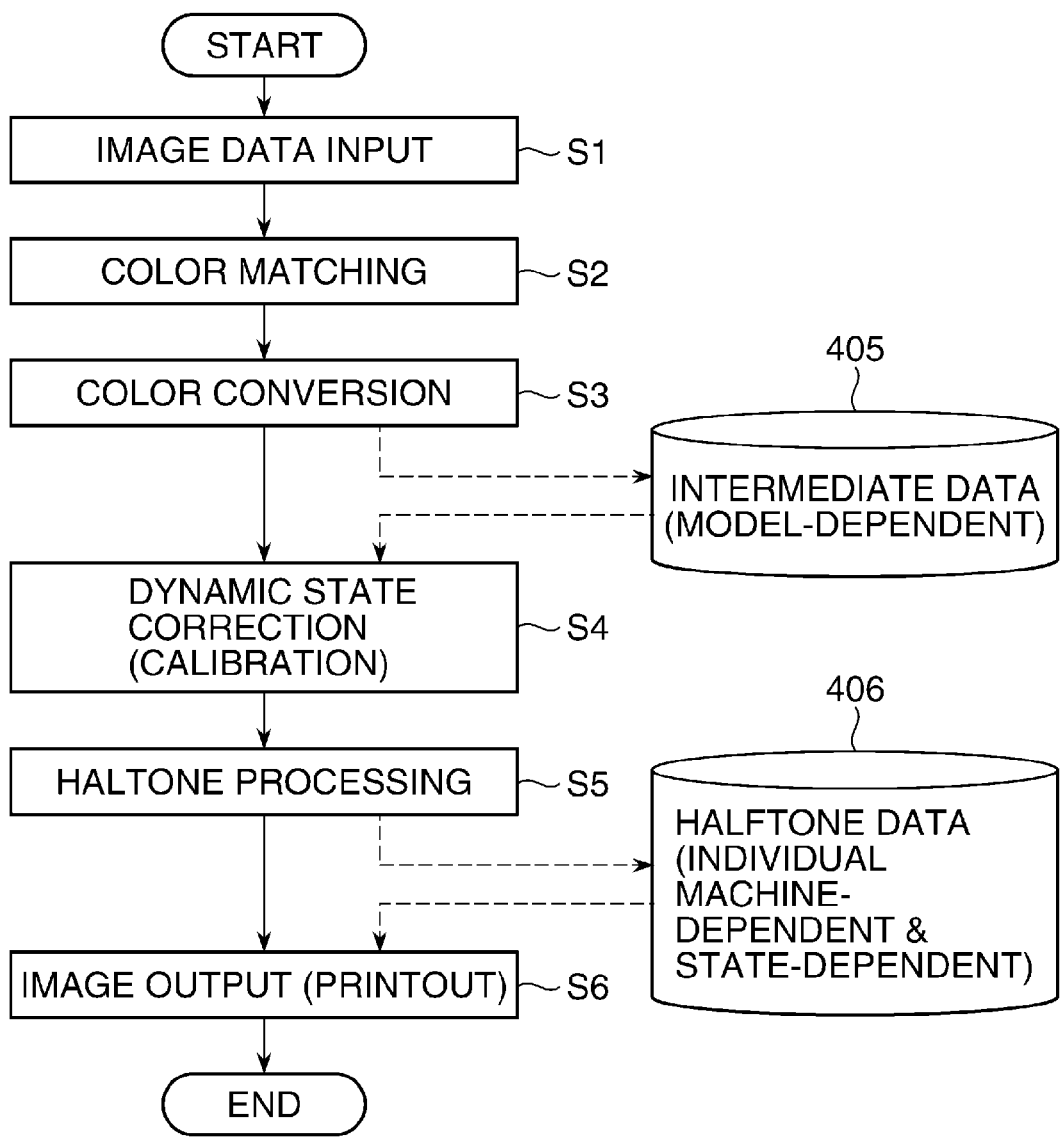
FIG. 4 is a flowchart of an image processing process executed by the image processing apparatus.

First, a general image processing process and intermediate data generated during the process will be described with reference to FIG. 4. FIG. 4 is a flowchart of the image processing process executed by the image processing apparatus 20. A control program for the present process is stored in the ROM 202 and is executed by the CPU 201.

When image data is received (step S1), the image processing apparatus 20 performs color matching on the received image data (step S2). Further, the image processing apparatus 20 performs color conversion (step S3). Data generated by this color conversion will be referred to as intermediate data 405. This data is model-dependent data which depends on the model of an image processing apparatus. Model-dependent data is not individual machine-dependent data, and therefore it can be used by any image processing apparatus of the same model.

The image processing apparatus 20 performs a correction process dependent on the state of the image processing apparatus 20 itself, i.e. a dynamic state correction (so-called calibration) on the generated intermediate data 405 (step S4).

The image processing apparatus 20 performs halftone processing to thereby generate halftone data (final print data) 406 (step S5). This halftone data 406 is individual machine-dependent and state-dependent data subjected to the dynamic state correction, and hence it is unreusable (or unsuitable for reuse) to any other image processing apparatus even if the apparatus is of the same model as that of the image processing apparatus 20.

The image processing apparatus 20 prints the image based on the halftone data 406 (step S6), followed by terminating the present process.

It should be noted that the image processing process in FIG. 4 is executed by a general color printer, and hence a monochrome printer can omit color conversion or dynamic state correction.

Figure 5:
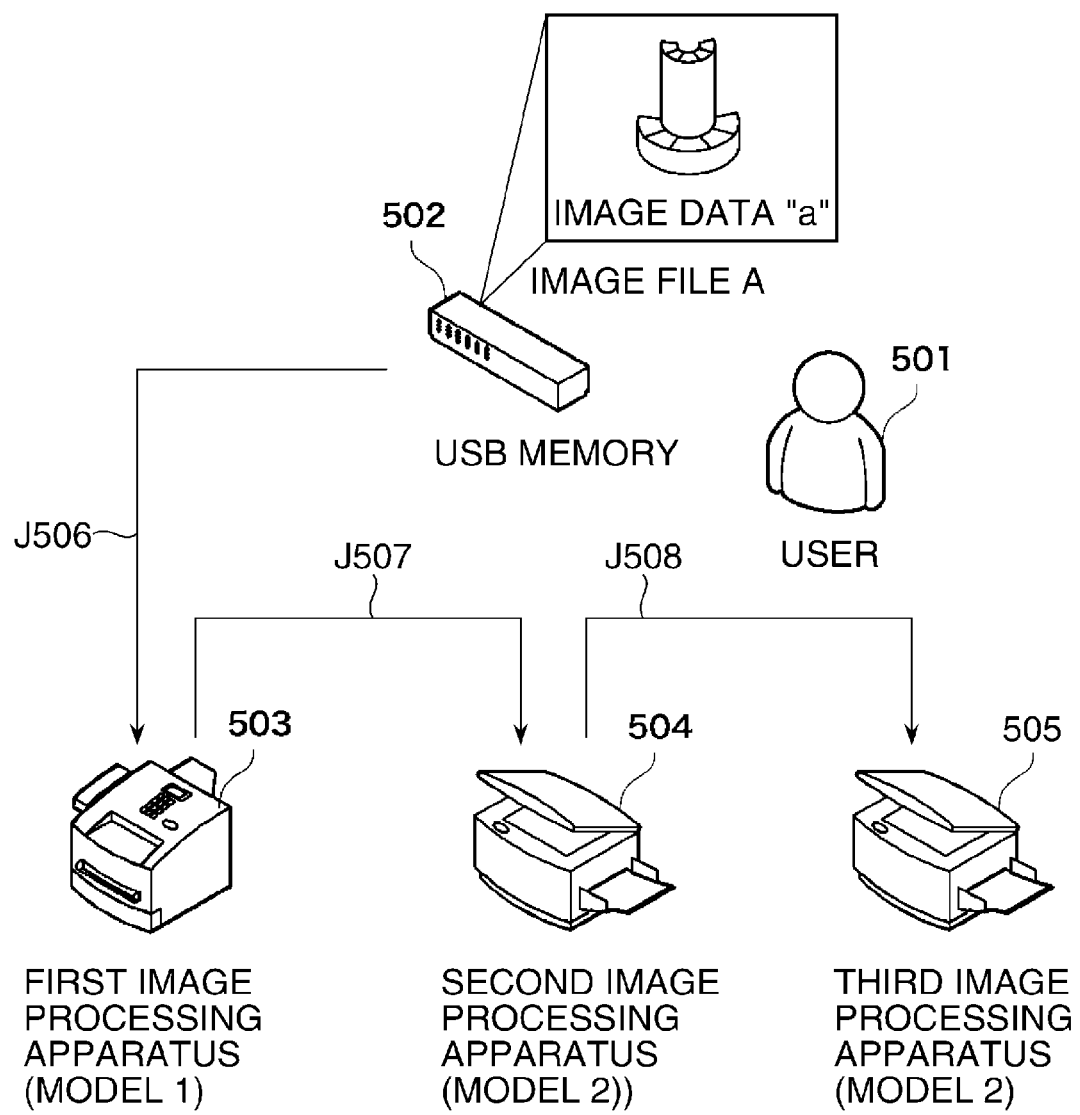
FIG. 5 is a diagram illustrating the execution sequence of printing.

Next, a description will be given of a specific execution sequence of printing in the image output system. FIG. 5 is a diagram illustrating the execution sequence of printing. In the present example, the removable medium 109 is implemented by a USB memory 502. Further, a first image processing apparatus (model 1) 503, a second image processing apparatus (model 2) 504, and a third image processing apparatus (model 2) 505 are used as the image processing apparatuses 20.

In the present example, it is assumed that an image file A containing image data "a" exists in the USB memory 502. First, a user 501 inserts the USB memory 502 into the first image processing apparatus 503 to cause the first image processing apparatus 503 to execute a printing process on the image file A. This operation will be referred to as "the printing operation J506". Data contained in the image file A will be described in detail hereinafter.

Then, the user 501 inserts the USB memory 502 into the second image processing apparatus 504 to cause the second image processing apparatus 504 to execute a printing process on the image file A. This operation will be referred to as "the printing operation J507".

Finally, the user 501 inserts the USB memory 502 into the third image processing apparatus 505 to cause the third image processing apparatus 505 to execute a printing process on the image file A. This operation will be referred to as "the printing operation J508".

Figure 6:
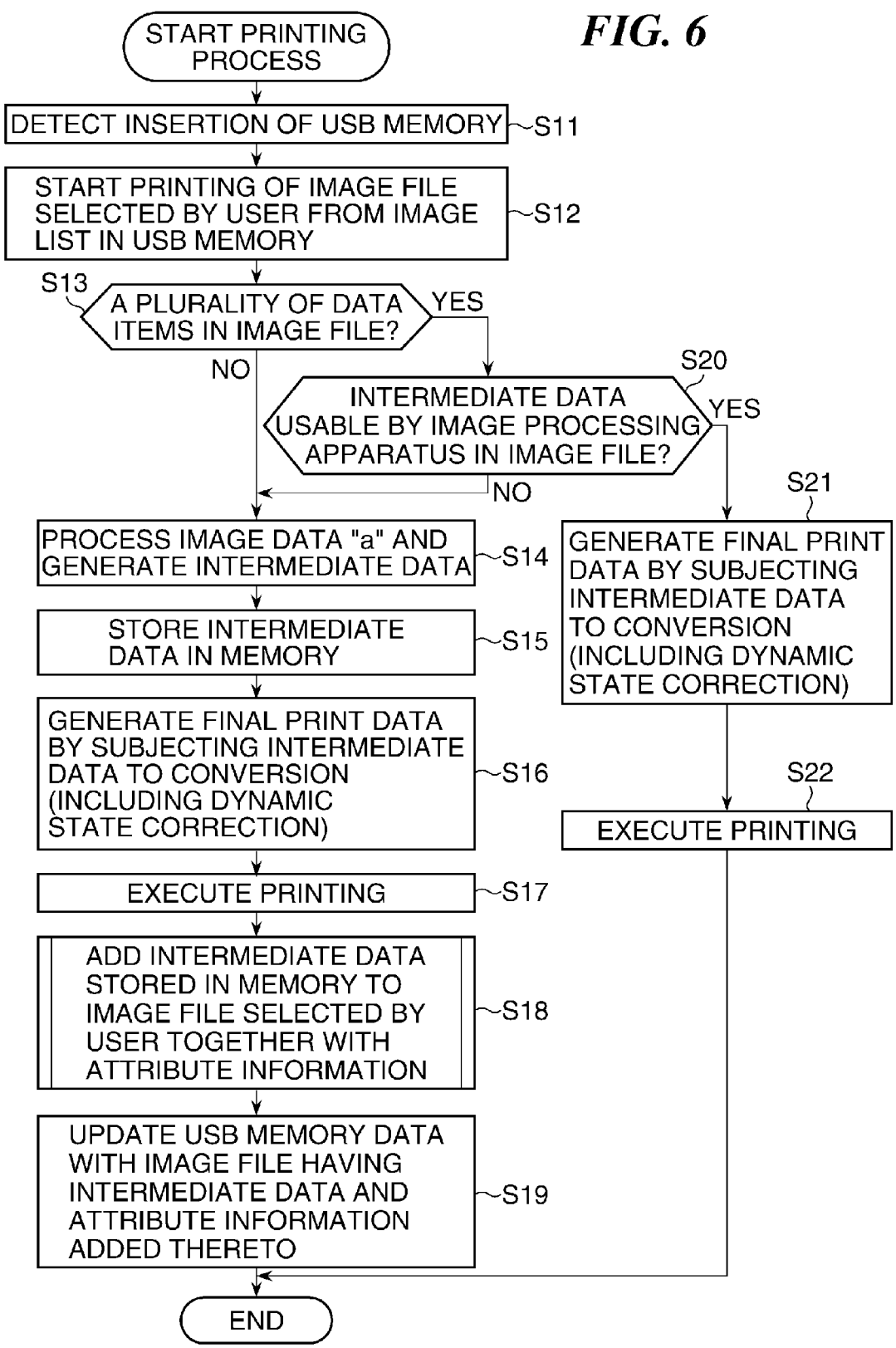
FIG. 6 is a flowchart of a printing process executed by the image processing apparatus.

FIG. 6 is a flowchart of the printing process executed by the image processing apparatus 20. A control program for the printing process is stored in the ROM 202 and is executed by the CPU 201. First, the printing process will be described according to the printing operation J506 by the first image processing apparatus 503 as the image processing apparatus 20. In the printing operation J506, intermediate data does not exist in the image file A, but only original image data is contained therein.

First, in the situation where the image file A containing the image data "a" exists in the USB memory 502, when the user 501 inserts the USB memory 502 into the first image processing apparatus 503, the first image processing apparatus 503 detects the insertion (step S11).

When the user 501 selects the desired image file A by referring to an image list displayed on the first image processing apparatus 503, the first image processing apparatus 503 starts execution of printing (step S12).

Figure 7:
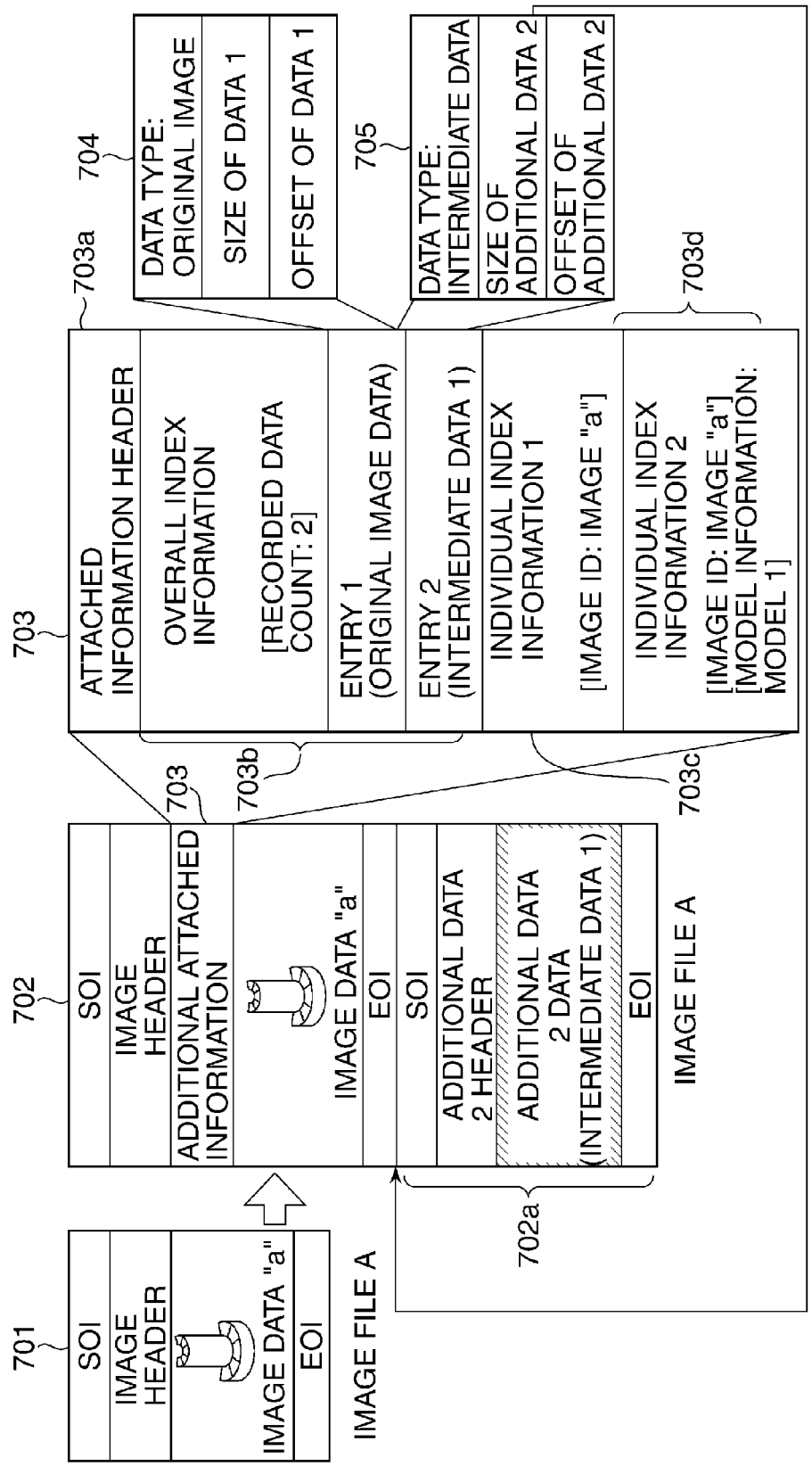
FIG. 7 is a diagram useful in explaining the structure of an image file A for use in a printing operation.
Figure 8:
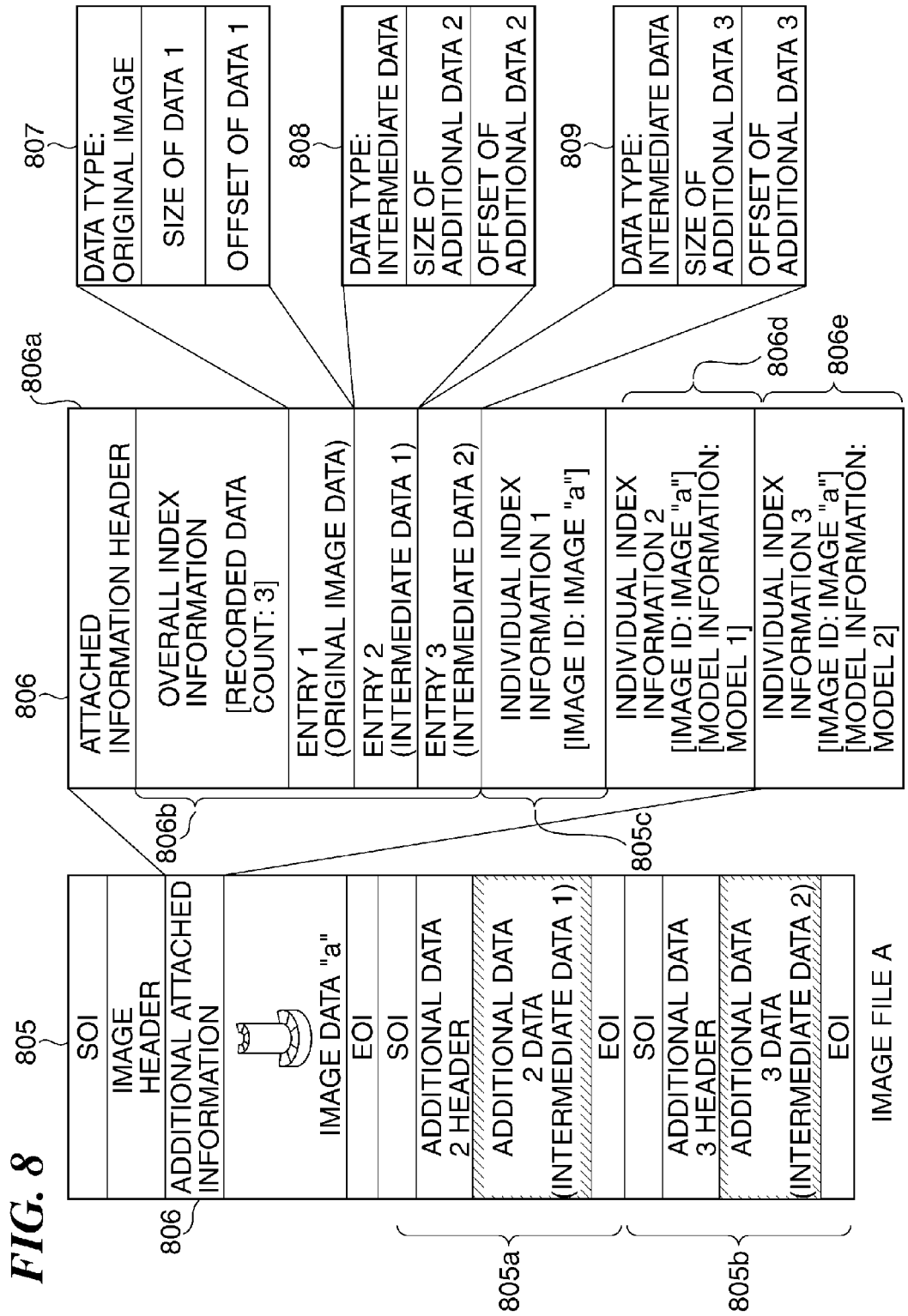
FIG. 8 is a diagram useful in explaining the structure of the image file A for use in printing operation.

The first image processing apparatus 503 determines whether or not the designated image file A contains data other than the original image data (step S13). FIGS. 7 and 8 are diagrams useful in explaining the structure of the image file A for use in printing operation. Specifically, the image file A (701) contains only the ordinary image data "a". On the other hand, the image file A (702) contains not only the ordinary image data "a", but also other data (intermediate data 1) than the ordinary image data "a".

In the step S13, the first image processing apparatus 503 determines whether or not the image file A contains other data than the ordinary image data "a", i.e. at least additional attached information 703. If the image file A contains only one image data item, the process proceeds to a step S14, whereas if the image file A contains a plurality of data items, i.e. if it contains data other than the image data "a", the process proceeds to a step S20.

In the situation where the printing operation J506 is being performed, the image file A is in a state denoted by reference numeral 701, which means that the image file A contains only the image data "a", and hence the process proceeds to the step S14.

The first image processing apparatus 503 performs processing including the steps S2 and S3 in FIG. 4 on the image data "a" to thereby generate the intermediate data 405 (step S14). Here, it is assumed that the intermediate data 405 is model-dependent data which other image processing apparatuses can use insofar as they are of the same model as the first image processing apparatus 503.

The first image processing apparatus 503 temporarily stores the intermediate data 405 generated in the step S14 in the memory (RAM 203) (step S15). The first image processing apparatus 503 further processes the generated intermediate data 405 to generate halftone data 406 as final print data (step S16). The processing in the step S16 includes dynamic state correction by the first image processing apparatus 503. Therefore, the final print data cannot be reused by any other image processing apparatus even if the apparatus is of the same model as the first image processing apparatus 503.

The first image processing apparatus 503 performs printing using the halftone data 406 generated as the final print data (step S17).

The first image processing apparatus 503 adds the intermediate data 405 stored in the step S15 to the image file A selected by the user in the step S12 (step S18).

The image file A (701) selected by the user is converted into the image file A (702) by adding the intermediate data 405 to the image file A (701). Specifically, the first image processing apparatus 503 adds the additional attached information 703 to the image file A (701), and further adds the intermediate data 1 (405) generated in the step S14 to the image file A (701) in the form of data 702*a*, to thereby convert the image file A (701) into the image file A (702).

The additional attached information 703 is comprised of an attached information header 703*a*, overall index information 703*b*, and individual index information 703*c* and 703*d*. The recorded data count of the overall index information 703*b* is set to 2. Further, the data type in an entry 1 (704) is set to information indicative of "original image data", and the data type in an entry 2 (705) is set to information indicative of "intermediate data".

Further, an "image ID (image "a")" is set as attribute information of the individual index information 1 (703*c*), and the "image ID (image "a")" and "model information: model 1" are set as attribute information of the individual index information 2 (703*d*).

After having added the intermediate data and the attribute information to the image file A, the first image processing apparatus 503 updates the image file A (701) in the USB memory by overwriting same with the image file A (702) updated in the step S18 (step S19), followed by terminating the present process executed according to the printing operation J506.

Next, the printing process will be described according to the printing operation J507 by the second image processing apparatus 504 as the image processing apparatus 20. In the printing operation J507, intermediate data is contained in the image file A, but it is data for a model different from that of the second image processing apparatus 504. In this case, therefore, the intermediate data cannot be reused by the second image processing apparatus 504.

First, in the situation where the image file A containing the image data "a" and the intermediate data 1 for the model 1 exists in the USB memory 502, the second image processing apparatus 504 detects that the USB memory 502 has been inserted therein by the user 501 (step S11). In the case of the printing operation J507, the image file A is in the state denoted by reference numeral 702.

When the user selects the desired image file A (702) by referring to an image list displayed on the second image processing apparatus 504, the second image processing apparatus 504 starts execution of printing (step S12).

The second image processing apparatus 504 determines whether or not the designated image file A (702) contains data other than the original image data (step S13). In the case of this example, the image file A (702) contains not only the ordinary image data "a", but also other data than the ordinary image data "a".

In the step S13, the second image processing apparatus 504 determines whether or not the image file A contains other data than the ordinary image data "a", i.e. at least the additional attached information 703. If the image file A contains only one image data item, the process proceeds to the step S14, whereas if the image file A contains a plurality of data items, i.e. if it contains data other than the image data "a", the process proceeds to the step S20.

In the situation where the printing operation J507 is being performed, the image file A is in the state denoted by reference numeral 702, which means that the image file A contains not only the image data "a" but also intermediate data, and hence the second image processing apparatus 504 determines whether or not the image file A contains intermediate data usable by the apparatus 504 (step S20). If no usable intermediate data exists, the process proceeds to the step S14, whereas if usable intermediate data exists, the process proceeds to a step S21.

Now, a description will be given of an example of how the determinations in the steps S13 and S20 are performed. By referring to the recorded data count in the overall index information 703*b* in the additional attached information 703 in the image file in FIG. 7, it is possible to determine that the number of data items contained in the image file A is equal to 2.

Further, by referring to data type in each of the entries 1 and 2, it is determined that the entry 1 is "original image data", and the entry 2 is "intermediate data". Furthermore, by referring to the individual index information 1, it is possible to determine that the image ID is [image "a"]. Similarly, by referring to the individual index information 2, it is possible to determine that the image ID is [image "a"] and the model information is "model 1". Based on these information items, it is possible to determine that the image file A (702) contains the original image data of the image "a" and the intermediate data 1 of the image "a" for the model 1.

In the printing operation J507, the model of the second image processing apparatus 504 is "model 2", and therefore it is possible to determine that no associated compatible intermediate data is contained in the image file A (702).

The second image processing apparatus 504 performs processing including the steps S2 and S3 in FIG. 4 on the image data "a" to thereby generate the intermediate data 405 (step S14). Here, it is assumed that the intermediate data 405 is model-dependent data which other image processing apparatuses can reuse insofar as they are of the same model as that of the second image processing apparatus 504.

The second image processing apparatus 504 temporarily stores the intermediate data 405 generated in the step S14 in the memory (RAM 203) (step S15). The second image processing apparatus 504 further processes the generated intermediate data 405 to generate the halftone data 406 as the final print data (step S16). The processing in the step S16 includes dynamic state correction by the second image processing apparatus 504. Therefore, the final print data cannot be used by any other image processing apparatus even if the apparatus is of the same model as the second image processing apparatus 504.

The second image processing apparatus 504 performs printing using the halftone data 406 generated as the final print data (step S17).

The second image processing apparatus 504 adds the intermediate data 2 (405) for the model 2, which was stored in the step S15, to the image file A (702) selected by the user in the step S12, to thereby convert the image file A (702) into an image file A (805) (step S18). More specifically, the second image processing apparatus 504 forms the image file A (805) by adding, to the image file A (702), an entry 3 in overall index information 806*b* thereof and individual index information 3 (806*e*) in additional attached information 806 thereof. Further, the second image processing apparatus 504 adds the intermediate data 2 generated in the step S14 to the image file A (702) in the form of data 805*b*.

The recorded data count in the overall index information 806*b* in the additional attached information 806 is changed to 3. Further, the data type in the entry 3 (809) added is set to "intermediate data". Furthermore, "image ID (image "a")" and "model information: model 2" are set as attribute information of the individual index information 3 (806*e*).

After having added the intermediate data and the attribute information to the image file A, the second image processing apparatus 504 updates the image file A (702) in the USB memory by overwriting same with the image file A (805) updated in the step S18 (step S19), followed by terminating the present process executed according to the printing operation J507.

Next, the printing process will be described according to the printing operation J508 by the third image processing apparatus 505. In the printing operation J508, intermediate data is contained in the image file A (805), and it is data for the same model as that of the second image processing apparatus 504. Therefore, the intermediate data can be reused.

First, in the situation where the image file A containing the image data "a", the intermediate data 1 for the model 1, and the intermediate data 2 for the model 2 exists in the USB memory 502, the third image processing apparatus 505 detects that the USB memory 502 has been inserted therein by the user 501 (step S11).

When the user selects the desired image file A (805) by referring to an image list displayed on the third image processing apparatus 505, the third image processing apparatus 505 starts execution of printing (step S12).

The third image processing apparatus 505 determines whether or not the designated image file A contains data other than the original image data (step S13). In the case of the present example, the image file A (805) contains not only the ordinary image data "a", but also other data than the ordinary image data "a".

In the step S13, the third image processing apparatus 505 determines whether or not the image file A contains other data than the ordinary image data "a", i.e. at least the additional attached information 806. If the image file A contains only one image data item, the process proceeds to the step S14, whereas if the image file A contains a plurality of data items, i.e. if it contains data other than the image data "a", the process proceeds to the step S20.

In the situation where the printing operation J508 is being performed, the image file A (805) is in a state containing not only the image data "a" but also the intermediate data 1 for the model 1 and the intermediate data 2 for the model 2. Therefore, the third image processing apparatus 505 determines whether or not the image file A contains intermediate data usable by the apparatus 505 (step S20). If no usable intermediate data exists, the process proceeds to the step S14, whereas if usable intermediate data exists, the process proceeds to the step S21.

In the printing operation J508, the model of the third image processing apparatus 505 is "model 2", and therefore it is possible to determine that the associated compatible intermediate data for the model 2 is contained in the image file A.

The third image processing apparatus 505 performs processing including the steps S4 and S5 (dynamic state correction and halftone processing) on the intermediate data 2 (805*b*) stored in the image file A (805) to thereby generate the halftone data as the final print data (step S21). This processing includes dynamic state correction, and therefore the final print data is data which cannot be reused by any other image processing apparatus even if the apparatus is of the same model as that of the third image processing apparatus 505.

The third image processing apparatus 505 actually performs printing using the halftone data generated as the final print data in the step S21 (step S22), followed by terminating the present process executed according to the printing operation J508.

As described above, the image processing apparatus stores reusable intermediate data after execution of a printing process on image data stored in image file data, and adds the intermediate data to the image file data. In a second-time or following printing operations, when reusable intermediate data exists, the image processing apparatus reuses it.

According to the image processing apparatus of the first embodiment, in a case where image file data does not contain reusable data for printing, it is possible to add reusable data to the image file data to thereby speed up second-time and following printing operations. Further, by storing intermediate date subjected to processing up to color conversion and reusable by other apparatuses in a printing operation, it is possible not only to improve reusability of the intermediate date in another apparatus, but also to increase the speed of printout. Thus, the image processing apparatus of the first embodiment can achieve enhancement of reusability of intermediate date in another apparatus and an increase in the speed of printout at the same time.

Further, since intermediate date is added to an image file and at the same time additional attached information (attribute information) of the image file is added or modified, it is possible to easily grasp the existence of the intermediate date.

Furthermore, by checking additional attached information, it is possible to easily know whether or not reusable data associated with a requested printing process exists in an image file.

What is more, it is possible to easily update additional attached information according to data stored in an image file.

Although in the first embodiment, an image file is stored in a USB memory, a hard disk or another kind of removable medium may be used as a recording medium for storing the image file. Further, as mentioned hereinbefore, either of network connection and direct connection can be employed for transfer of an image file.

In the first embodiment, when intermediate data is generated anew, it is always added to an original file. However, in place of always adding intermediate data to an original file, an attribute for determining whether or not to add intermediate data may be provided in additional attached information (703 or 806) on an output apparatus and an image file, to thereby enable the user to determine whether to add the intermediate data, as desired.

Hereafter, a description will be given of a second embodiment of the present invention. In the second embodiment, there will be described, by way of example, a case where image data in an image file stored in a digital camera is previewed on a display operation section of an image processing apparatus. When preview data usable by the image processing apparatus exists in an image file, the image processing apparatus performs preview display using the preview data. On the other hand, when usable preview data does not exist, the image processing apparatus adds preview data generated after execution of normal preview display to an image file. Preview data usable by the image processing apparatus means image data having e.g. a resolution, a color expression format (RGB, CMYK, etc.), and the like suitable for display on the display operation section of the image processing apparatus.

Figure 9:
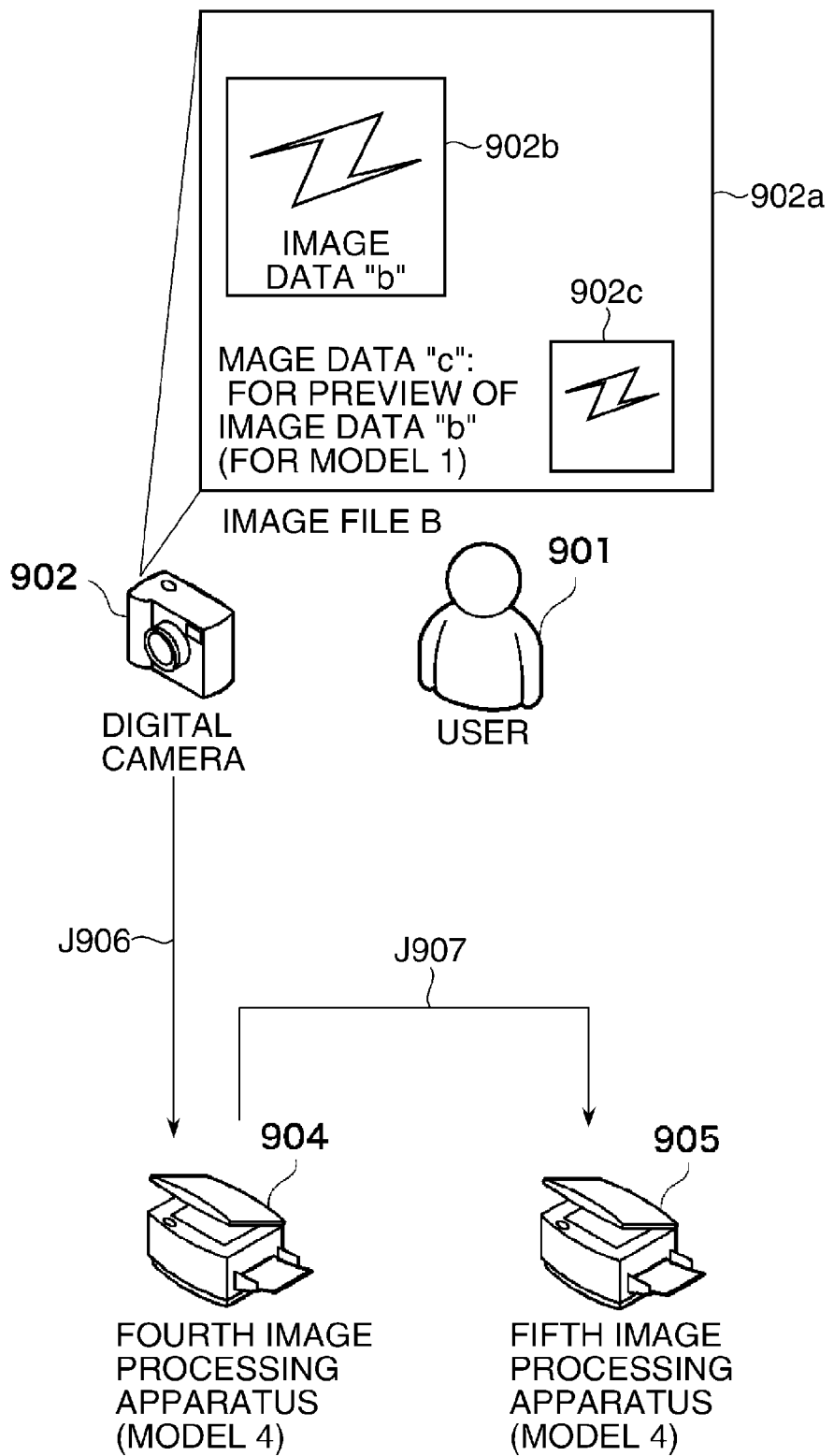
FIG. 9 is a diagram illustrating the execution sequence of preview display by an image processing apparatus according to a second embodiment of the present invention.

The arrangement of an image output system including an image processing apparatus according to the second embodiment is the same as that of the image output system including the image processing apparatus according to the first embodiment, and therefore description thereof is omitted. FIG. 9 is a diagram illustrating the execution sequence of preview display in the second embodiment. In the second embodiment, it is assumed that an image file B (902*a*) storing image data "b" (902*b*) exists in a digital camera 902 as an image file storage apparatus or device 10.

A user 901 connects the digital camera 902 to a fourth image processing apparatus 904 as an image processing apparatus 20 and causes the fourth image processing apparatus 904 to perform preview display of the image file B (902a). This operation will be referred to as "the preview operation J906". Data stored in the image file B (902a) will be described in detail hereinafter.

Then, the user 901 connects the digital camera 902 to a fifth image processing apparatus 905 and causes the fifth image processing apparatus 905 to perform preview display of the image file B (902a). This operation will be referred to as "the preview operation J907". Data stored in the image file B (902a) will be described in detail hereinafter.

Figure 10:
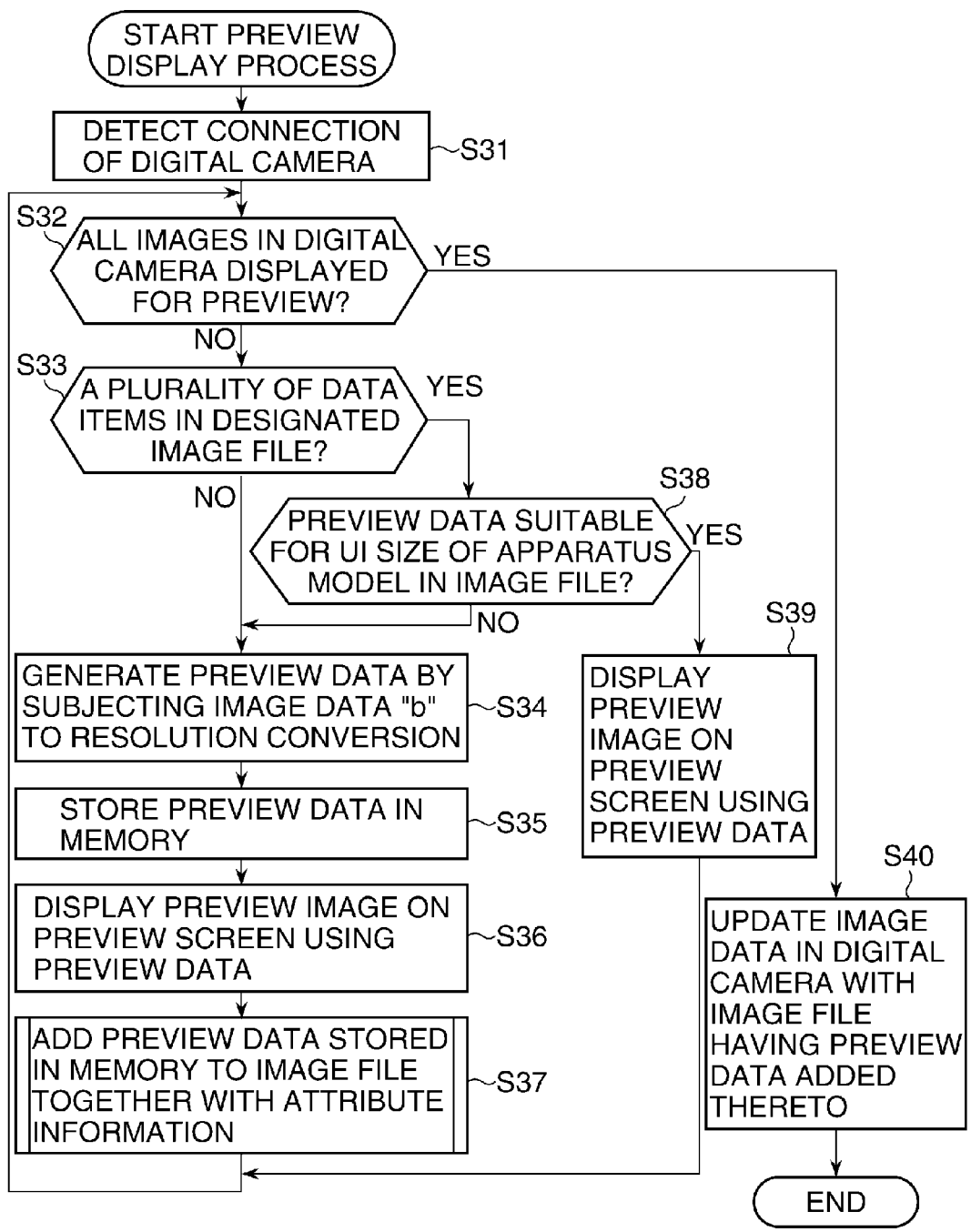
FIG. 10 is a flowchart of a preview display process.

FIG. 10 is a flowchart of a preview display process. To begin with, a preview process will be described according to the preview operation 906. A control program for this process is stored in the ROM 202 and executed by the CPU 201. In the preview operation J906, preview data is contained in the image file B, but it is for a model different from that of the fourth image processing apparatus 904. In this case, therefore, the preview data cannot be reused.

First, the fourth image processing apparatus 904 detects that the digital camera 902 has been connected thereto (step S31). In the present example, it is assumed that the image file B containing the image data "b" (902b) and preview data 902c for the model 1 as another model exists in the digital camera 902.

When the digital camera 902 is connected to the fourth image processing apparatus 904, the fourth image processing apparatus 904 determines whether or not preview images for all image files in the digital camera 902 have been generated and displayed for preview (step S32). If preview images have not been generated and displayed for all the image files, the process proceeds to a step S33, whereas if preview images for all the image files have been generated and displayed, the process proceeds to a step S40.

Figure 11:
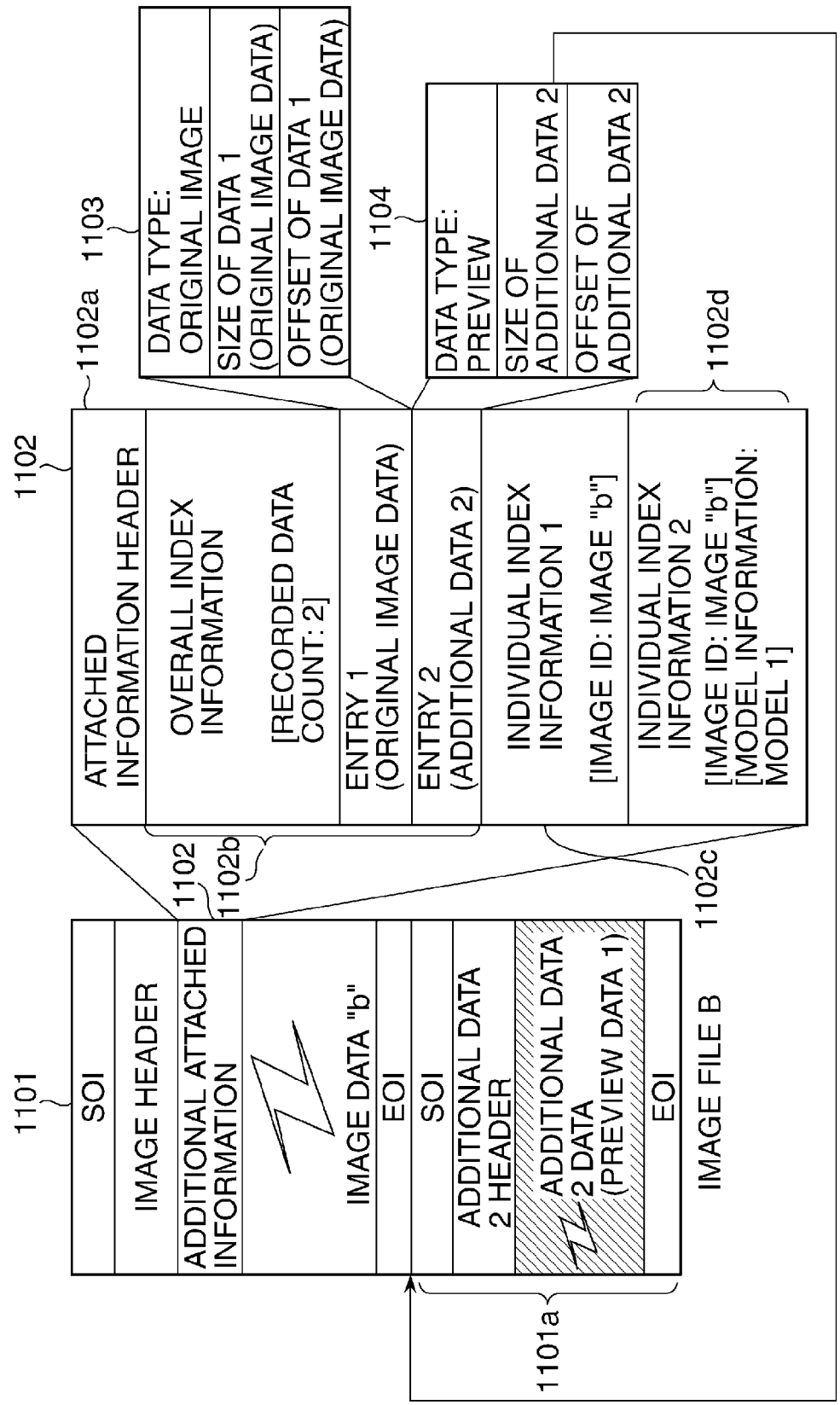
FIG. 11 is a diagram useful in explaining a structure of an image file B for use in a preview operation.

In the preview operation J906, it is assumed that only the image file B (902a) is stored in the digital camera 902. To generate and display a preview image of the image file B (902a), the process proceeds to the step S33, wherein the fourth image processing apparatus 904 determines whether or not the designated image file B (902a) contains a plurality of data items, i.e. whether or not it contains other data than the original image data (step S33). In the case of this example, the fourth image processing apparatus 904 determines whether or not additional attached information is contained in the image file B (902a). If only the image data "b" is contained in the image file B, the process proceeds to a step S34, whereas if data other than the image data is contained in the image file B, the process proceeds to a step S38. In the situation where the preview operation J906 is being performed, the image file B is in a state denoted by reference numeral 1101; as shown in FIG. 11. This means that the image file B contains not only the image data "b" but also preview data, and therefore the process proceeds to the step S38.

The fourth image processing apparatus 904 determines whether or not the image file contains preview data having a resolution suitable for the UI size of the model of the fourth image processing apparatus 904 (step S38). If no usable preview data exists, the process proceeds to the step S34, whereas if usable preview data exists, the process proceeds to a step S39.

Figure 12:
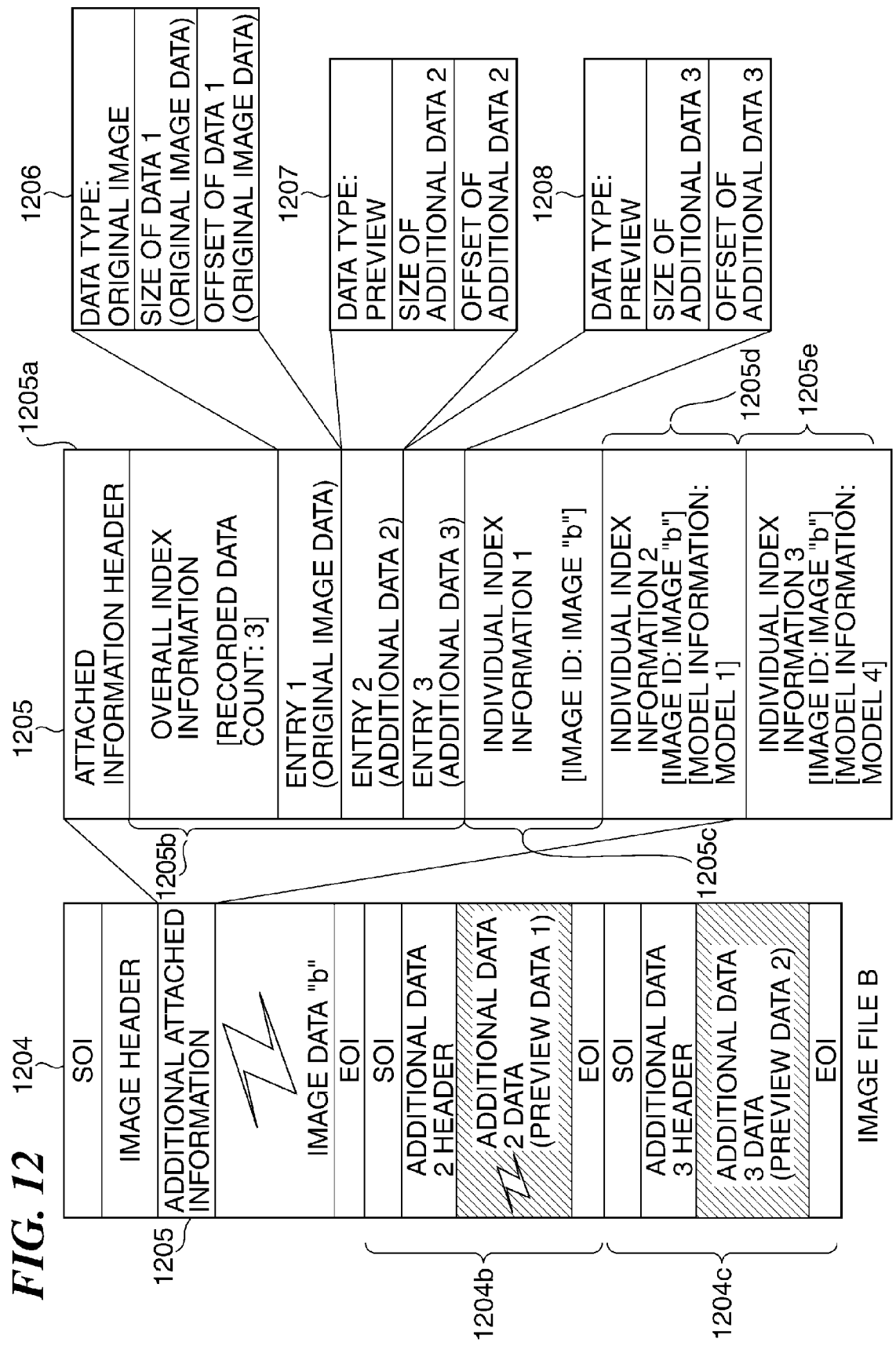
FIG. 12 is a diagram useful in explaining the structure of the image file B for use in a preview operation.

Now, a description will be given of an example of how the determinations in the steps S33 and S38 are performed. FIGS. 11 and 12 are diagrams useful in explaining the structure of an image file B for use in preview operations. In the case of FIG. 11, by referring to a recorded data count in overall index information 1102b in additional attached information 1102 in an image file B (1101), it is possible to determine that the number of recorded data items contained in the image file B is equal to 2.

Further, by referring to a data type in each of an entry 1 (1103) and an entry 2 (1104), it is determined that the entry 1 (1103) is "original image data", and the entry 2 (1104) is "preview data".

Furthermore, by referring to individual index information 1 (1102c), it is possible to determine that the image ID is [image "b"]. Similarly, by referring to individual index information 2 (1102d), it is possible to determine that the image ID is [image "b"] and the model information is "model 1".

Based on these information items, it is possible to determine that the image file B contains the original image data of the image "b" and the preview data 1 of the image "b" for the model 1.

In the preview operation J906, the model of the fourth image processing apparatus 904 is "model 4", and therefore it is possible to determine that associated compatible preview data is not contained in the image file B. Therefore, the answer to the question of the step S38 is negative (NO), and the process proceeds to the step S34.

The fourth image processing apparatus 904 performs resolution conversion on the image data "b" to thereby generate preview data 2 (step S34). The fourth image processing apparatus 904 temporarily stores the generated preview data 2 in the memory (RAM 203) (step S35).

The fourth image processing apparatus 904 displays a preview image using the preview data 2 generated in the step S34 (step S36). The fourth image processing apparatus 904 adds the preview data 2 (for the model 4) stored in the memory in the step S35 to the image file B which stores the original image data "b" (step S37).

More specifically, the image file B (1204) in FIG. 12 is formed by adding, to the image file B (1101), an entry 3 (1208) in overall index information 1205b thereof and individual index information 3 (1205e) in additional attached information 1205 thereof. Further, the preview data 2 generated in the step S34 is added in the form of data 1204c. In the additional attached information 1205, the recorded data count in the overall index information 1205b is changed to 3.

Further, the data type in the entry 3 (1208) added is set to "preview data", and "image ID (image "b")" and "model information: model 4" are set as attribute information of the individual index information 3 (1205e).

After the preview data and the attribute information having been added to the image file B, the present process by the fourth image processing apparatus 904 returns to the step S32.

In the preview operation J906, since only the image file B exists, the answer to the question of the step S32 becomes affirmative (YES) this time. Therefore, the process proceeds to the step S40, wherein the fourth image processing apparatus 904 overwrites the image file B (1101) in the digital camera 902 with the image file B (1204) updated in the step S37 (step S40). Then, the fourth image processing apparatus 904 terminates the present process executed according to the preview operation J906.

Next, a description will be given of a process executed according to the preview operation J907. In the preview operation J907, two preview data items are contained in the image file B. One of the preview data items is for the same model 4 as that of the fifth image processing apparatus 905, and therefore the fifth image processing apparatus 905 can reuse this preview data item.

First, the fifth image processing apparatus 905 detects that the digital camera 902 has been connected thereto (step S31). In the present example, it is assumed that the image file B (902a) containing the image data "b" (902b), the preview data 1 for the model 1 (902c), and the preview data 2 for the model 4 exist in the digital camera 902.

When the digital camera 902 is connected to the fifth image processing apparatus 905, the fifth image processing apparatus 905 determines whether or not preview images for all image files in the digital camera 902 have been generated and displayed for preview (step S32). If preview images have not been generated and displayed for all the image files, the process proceeds to the step S33, whereas if preview images for all the image files have been generated and displayed, the process proceeds to the step S40.

In the preview operation J907 as well, it is assumed that only the image file B (902a) is stored in the digital camera 902. To generate and display a preview image of the image file B (902a), the process proceeds from the step S32 to the step S33.

The fifth image processing apparatus 905 determines whether or not the designated image file B (902a) contains other data than the original image data (step S33). In the situation where the preview operation J907 is being performed, the image file B is in a state denoted by reference numeral 1204, which means that the image file B contains not only the image data "b" but also the preview data 1 (for the model 1) and the preview data 2 (for the model 4), and therefore the process proceeds to the step S38.

The fifth image processing apparatus 905 determines whether or not the image file contains preview data having a resolution suitable for the UI size of the model of the image processing apparatus 905 (step S38). In the preview operation J907, since the model of the fifth image processing apparatus 905 is "model 4", it is possible to determine that the associated compatible preview data is contained in the image file B. Therefore, the process proceeds to the step S39.

The fifth image processing apparatus 905 performs preview display using the preview data 2 (1204c) stored in the image file B (1204) (step S39), and then the process returns to the step S32.

In the preview operation J907, it is assumed that the digital camera 902 stores only the image file B, and hence the answer to the question of the step S32 becomes affirmative (YES) this time, so that the process proceeds to the step S40. The step S40 is carried out so as to overwrite an original file with an image file updated anew in the step S37, but in the preview operation J907, the image file B has not been updated anew. Therefore, the fifth image processing apparatus 905 terminates the present preview display process.

As described above, after executing preview of image data contained in image file data, an image processing apparatus stores reusable preview data and adds the preview data to the image file data. Thus, when reusable preview data exists, it is possible to use the preview data in second-time and following preview display operations for preview of the image data.

According to the image processing apparatus of the second embodiment, when reusable preview data is not stored for a preview operation, it is possible to add preview data during a preview display process to thereby speed up second-time and following processing operations. Further, by storing preview date subjected to resolution conversion and reusable by other apparatuses, it is possible not only to improve reusability of preview date in another apparatus, but also to increase the speed of preview display output.

Although in the second embodiment, an image file is stored in a digital camera, the image file may be stored in a hard disk or a removable medium. Further, an image file may be transferred through either of network connection and direct connection.

Further, for preview display of a plurality of image data items, preview display may be performed after generation of all preview images. In addition, image files may be updated all together after execution of preview display, or alternatively, update of each image file may be executed after generation of an associated compatible preview image.

In the second embodiment, when preview data is generated anew, it is always added to an original file. However, in place of always adding preview data to an original file, an attribute for determining whether or not to add intermediate data may be provided in additional attached information (1102 or 1205) on an output apparatus and an image file, to thereby enable the user to determine whether to add the intermediate data, as desired.

It should be noted that the present invention is not limited to the above described embodiments, but can be modified in various manners based on the subject matter of the present invention, which should not be excluded from within the scope of the present invention insofar as functions as recited in the appended claims or the functions performed by the configuration of either of the above described embodiments can be achieved.

For example, the image processing apparatus may be implemented by any of a printing apparatus, a facsimile machine equipped with a printing function, a multifunction peripheral (MFP) equipped with a printing function, a copy function, a scanner function, etc., a display device for displaying preview images, and an information processing apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-227161 filed Sep. 4, 2008, which is hereby incorporated by reference herein in its entirety.

What is claimed is:

1. An image processing apparatus for processing file data containing image data, comprising:
   a process execution unit configured to execute a process requested for the image data, using data usable by the image processing apparatus, when the file data contains the data usable by the image processing apparatus in addition to the image data, and execute the requested process using the image data, when the file data does not contain data usable by the image processing apparatus in addition to the image data; and
   an adding unit configured to add data generated during execution of the requested process by said process execution unit using the image data, to the file data, as data usable by the image processing apparatus.

2. The image processing apparatus according to claim 1, wherein said adding unit not only adds the data generated during execution of the requested process by said process execution unit using the image data to the file data, as data usable by the image processing apparatus, but also adds attribute information to the file data or changes attribute information in the file data.

3. The image processing apparatus according to claim 1, further comprising a determination unit configured to determine whether or not the file data contains data usable by the image processing apparatus in addition to the image data, and
Wherein said determination unit comprises:
a multiple data determination unit configured to determine whether or not a plurality of data items are contained in the file data, and
a compatible data determination unit configured to be operable when said multiple data determination unit determines that a plurality of data items are contained in the file data, to determine whether or not data associated with the request process and usable by the image processing apparatus exists among the data items.

4. The image processing apparatus according to claim 3, wherein said multiple data determination unit and said compatible data determination unit perform determination based on the attribute information in the file data.

5. The image processing apparatus according to claim 2, wherein the requested process is a printing process or a preview display process to be executed on the image data contained in the file data.

6. The image processing apparatus according to claim 1, wherein when the requested process is the printing process, the data contained in the file data besides the image data and usable by the image processing apparatus, or the data generated during execution of the requested process by said process execution unit using the image data is usable at least by an apparatus identical in model to the image processing apparatus.

7. The image processing apparatus according to claim 5, wherein when the requested process is the preview display process, the data contained in the file data besides the image data and usable by the image processing apparatus, or the data generated during execution of the preview display process by said process execution unit using the image data is image data different in resolution from the image data.

8. The image processing apparatus according to claim 3, wherein when said adding unit is to add the data generated during execution of the requested process by said process execution unit using the image data to the file data, as the usable data, if it has been determined by said multiple data determination unit that the file data contains only the image data, but not the plurality of data items, said adding unit adds the usable data, and attribute information indicating that the file data contains the plurality of data items, to the file data.

9. The image processing apparatus according to claim 3, wherein when said multiple data determination unit determines that the file data contains the plurality of data items and when said compatible data determination unit determines that data associated with the request process and usable by the image processing apparatus does not exist among the data items, said adding unit adds the data generated during execution of the requested process by said process execution unit using the image data to the file data, and changes or adds the attribute information indicating that the file data contains the plurality of data items.

10. A method of controlling an image processing apparatus for processing file data containing image data, comprising:
executing a process requested for the image data, using data usable by the image processing apparatus, when the file data contains the data usable by the image processing apparatus in addition to the image data, and executing the requested process using the image data, when the file data does not contain data usable by the image processing apparatus in addition to the image data; and
adding data generated during execution of the requested process using the image data, to the file data, as data usable by the image processing apparatus.

11. A storage medium storing a program for causing a computer to execute a method of controlling an image processing apparatus for processing file data containing image data,
wherein the method comprises:
executing a process requested for the image data, using data usable by the image processing apparatus, when the file data contains the data usable by the image processing apparatus in addition to the image data, and executing the requested process using the image data, when the file data does not contain data usable by the image processing apparatus in addition to the image data; and
adding data generated during execution of the requested process using the image data, to the file data, as data usable by the image processing apparatus.

* * * * *